(12) United States Patent
Tsao et al.

(10) Patent No.: US 6,724,962 B2
(45) Date of Patent: Apr. 20, 2004

(54) WAVELENGTH TO OPTICAL POWER CONVERTER AND METHOD FOR CONVERTING WAVELENGTH INTO OPTICAL POWER

(75) Inventors: Shyh-Lin Tsao, Hsin Tein (TW); Wen-Ming Cheng, Hsin Chuang (TW)

(73) Assignee: Yuan Ze University, Yaoyuan (TW)

( * ) Notice: Subject to any disclaimer, the term of this patent is extended or adjusted under 35 U.S.C. 154(b) by 136 days.

(21) Appl. No.: 10/056,321

(22) Filed: Jan. 23, 2002

(65) Prior Publication Data

US 2003/0138195 A1 Jul. 24, 2003

(51) Int. Cl.[7] .................................................. G02B 6/44
(52) U.S. Cl. ........................ 385/104; 385/88; 385/139
(58) Field of Search ........................... 385/12, 13, 27, 385/28, 88, 89, 92, 76, 77, 139

(56) References Cited

U.S. PATENT DOCUMENTS

| | | | | |
|---|---|---|---|---|
| 4,495,411 A | * | 1/1985 | Rashleigh | 385/13 |
| 4,525,818 A | * | 7/1985 | Cielo et al. | 385/13 |
| 4,697,876 A | * | 10/1987 | Dyott | 385/12 |
| 4,799,752 A | * | 1/1989 | Carome | 385/12 |
| 4,834,497 A | * | 5/1989 | Angel | 385/12 |
| 5,022,754 A | | 6/1991 | Varnham | |
| 5,189,485 A | | 2/1993 | Hackel et al. | |
| 5,401,956 A | * | 3/1995 | Dunphy et al. | 250/227.18 |
| 5,420,687 A | | 5/1995 | Kachanov | |
| 5,528,409 A | * | 6/1996 | Cucci et al. | 398/15 |
| 5,535,038 A | * | 7/1996 | Hinch | 398/182 |
| 5,689,594 A | * | 11/1997 | Mao | 385/24 |
| 5,991,489 A | * | 11/1999 | Kondo | 385/129 |
| 6,370,289 B1 | * | 4/2002 | Bennett | 385/12 |
| 6,496,301 B1 | * | 12/2002 | Koplow et al. | 385/104 |
| 2002/0001426 A1 | * | 1/2002 | Dyott | 385/12 |

* cited by examiner

Primary Examiner—Michael P. Stafira
Assistant Examiner—Juan D Valentin

(57) ABSTRACT

A wavelength to optical power converter and a method for converter a wavelength into an optical power are provided. The wavelength to optical power converter includes an input fiber pigtail for inputting an optical wavelength signal, a spiral fiber connected to the input fiber pigtail, a cylinder for fixing the spiral fiber, an output fiber pigtail extended from the spiral fiber, and an optical detector connected to the output fiber pigtail for reading a signal from the output fiber pigtail to generate the optical power, wherein the spiral fiber outputs the optical power in response to the optical wavelength signal, thereby performing a conversion from the wavelength into the optical power.

26 Claims, 21 Drawing Sheets

WAVELENGTH TO OPTICAL POWER CONVERTER AND METHOD FOR CONVERTING WAVELENGTH INTO OPTICAL POWER

FIELD OF THE INVENTION

The present invention is related to a wavelength to optical power converter and a method thereof, and more particularly to a fiber-optic winding wavelength to optical power converter and a method for converting the wavelength into the optical power in a fiber-optic communication system.

BACKGROUND OF THE INVENTION

The present Dense Wavelength Division Multiplexing (DWDM) system is adopted by using a 100/200 GHz channel spacing and is capable of operating in a long-term and acquiring a crosstalk specification. A distributed feedback (DFB) is capable of being normally operated in a short-term but a wavelength drift will be generated over a long period of time. Therefore, it is important and necessary to monitor an actual operating wavelength of the DWDM system. Consequently, it would be an urgent issue how to stably operate in a fiber-optic broadband network which is of a gradually raised demand in the market, besides adding the fiber-optic bandwidth.

Presently, an interferometer and a Fiber Bragg Grating (FBG) sensor such as a Fabry-Perot interferometer and a linear FBG are adopted for being regarded as a wavelength discriminator to convert a variable signal of the distributed feedback (DFB) laser wavelength variation into a variable optical intensity. Therefore, the practical operation of the wavelength discriminator in a Wavelength Division Multiplexing (WDM) fiber-optic network is a future tendency and the present invention is a practical application in relation to this field.

Many wavelength detecting techniques are applied in the Wavelength Division Multiplexing/Dense Wavelength Division Multiplexing (WDM/DWDM) broadband fiber-optic network, but active components or passive components developed by these wavelength detecting techniques are more complicated to be not easily obtainable or identifiable by the users. Consequently, these techniques don't include better practicability and technical maturity. Certain other techniques include a higher price level and the cost thereof is difficult to be reduced.

A real time and full wave-band wavelength monitoring system including a 0.076 nm/dB resolution, 0.02 nm precision, 16 channels and 200 GHz channel spacing and composed of a Phased Array Wavelength Grating (PAWG), an array of 32 detectors and an A/D (alternating current/direct current) converter of 64 channels is disclosed by Shan Zhong, Chau-Han Lee, Xiao-Hui Yang, Yung-Jui Chen and Dennis Stone, in "Integrated real time multi-channel wavelength monitoring circuit using phased-array waveguide grating", Digest of Optical Fiber Communication, Volume 3, 1997, pages 30–32. The PAWG accomplished by a double WDM channel resolution and an $\alpha/2$ angle difference is capable of covering full wave-band frequency spectrum to generate two differential curves by using a drift of a central wavelength at the halfway of the channel spacing to confirm the convergence of the blind spot. The system is used for a real time and full wave-band wavelength monitoring in the DWDM system. This wavelength detecting method by using an Array Wavelength Grating (AWG) is a more complicated, undeveloped technique and easily affected by the environment temperature so that it has a lower reliability and includes a more expensive cost.

A simple method of stabilizing wavelength used for monitoring and controlling the wavelength of the DWDM system in order to solve an output or a display of a long-wavelength drift over the limit of a free-running DFB laser transmitter is disclosed by B. Villeneuve, H. B. Kim, M. Cry and D. Gariepy, in "A Compact Wavelength Stabilization Scheme for Telecommunication Transmitters", Digest of the IEEE/LEOS Summer Topical Meeting, 1997, pages 19–20. The method includes the steps of providing two very close optical diodes, capturing two spectral responses by using a periodic transmissive frequency response of a Fabry-Perot (FP) filter, and calculating a measurable wavelength value via the difference between the two spectral responses. A unit is independently existent under the above-mentioned conception and can be merged into an existent laser module without an extra electric power because of its tiny volume. But the unit includes a high level of manufacturing technique, a highly difficult components assembly, a high rejection rate and a higher cost and is difficult for sourcing components to maintain. Consequently, because the unit does not arrive at the stage of being put in mass production and practical application yet, it is not proper to be applied in a local area network (LAN), i.e. Fiber to the Home (FTTH) WDM/DWDM network system, and particularly to be the consumer end without any professional backgrounds.

A wavelength monitoring technique by using a relation between a carrier from a semiconductor optical amplifier and an incident optical wavelength, and detecting a transmission point of the semiconductor optical amplifier to measure and track the wavelength in the DWDM system is disclosed by San-Liang Lee, Ching-Tang Pien and Yu-Yi Hsu, in "Wavelength monitoring with low cost laser diodes for DWDM applications", Electronics Letters, Volume 36, Issue 6, 2000. Consequently, the above-mentioned purpose is achieved by biasing a laser diode under the threshold limit value (TLV) or using the semiconductor optical amplifier on an anti-reflective coating layer. Moreover, it also is very suitable to detect the discontinuous or separate components by using the external wavelength or stabilizing the wavelength of the laser diode.

This kind of wavelength monitoring technique is capable of being used to discriminate the operating interface thereof by using the fixed bias or scan the mode type. This technique is used for stabilizing the wavelength with regard to the wavelength drift because of a lower cost of the laser diode, but the semiconductor optical amplifier used therein is very expensive. Therefore, it is not suitable to be applied to the wavelength detection in the general local area network (LAN).

A wavelength meter having multiple wavelength laser inputs is disclosed by Hackel et al., in "Wavelength meter having single mode fiber optics multiplexed inputs", U.S. Pat. No. 5,189,485, filed on Feb. 21, 1991. This wavelength meter has a multiplexer to remote-control multiple lasers via a single mode fiber-optic for inputting one of the plurality of laser beam signal inputs into a wavelength measuring device, and thus is capable of improving the calibration capability of the wavelength measuring device in a real-time and online manner by referring to a predetermined laser beam wavelength. Thus, the wavelength measuring technique includes a practicability and is available by the present invention having a lower cost.

A method and apparatus for determining the wavelength of optical radiation, i.e. the visible radiation light are disclosed by Varnham, in "Determining the wavelength of optical radiation", U.S. Pat. No. 5,022,754, filed on Aug. 7, 1989. The optical radiation is subjected to two or more wavelength dependent phase modulations having a net effect which is wavelength dependent and is zero at a predetermined wavelength. The net modulation is then determined so as to obtain the difference between the predetermined wavelength and the actual wavelength of the optical radiation. However, it is difficult for one skilled in the modulation technique so that it does not include a practicability.

A microprocessor having an interferometer with linearizing interference fringe pattern for determining the wavelength of laser light is disclosed by Kachanov, in "Interferometer with processor for linearizing fringers for determining the wavelength of laser light", U.S. Pat. No. 5,420,687, filed on Oct. 4, 1993. The interference fringe pattern is detected by a charge-coupled device (CCD) array and is sent to a computer to be processed. The computer compares the result to determine the wavelength of laser light.

The above-mentioned papers and patents are the presently main techniques for monitoring and measuring the wavelength in Wavelength Division Multiplexing (WDM). However, some of those techniques are too expensive to having practicability. Moreover, some key components used in the techniques include complex manufacturing process and cannot be obtained easily. Further, variant factors affecting the above-mentioned system are very complex and don't include a high stability so that they are not easily controllable.

It is therefore tried by the applicant to deal with the above situations encountered in the prior art.

SUMMARY OF THE INVENTION

It is therefore an object of the present invention to provide a simple, lower cost and practical wavelength to optical power converter and a method for converting the wavelength into the optical power by applying a bending property of single mode and spiral fiber to output different optical powers in response to different input wavelength signals.

It is another object of the present invention to provide the wavelength to optical power converter and the method for converting the wavelength into the optical power operated in broadband channel form 750 nm to 1750 nm to have a good one to one mapping relation between the wavelength and the optical power.

It is another object of the present invention to provide the wavelength to optical power converter and the method for converting the wavelength into the optical power by applying a working principle based on the single mode intrinsic bending loss.

According to an aspect of the present invention, there is provided a wavelength to optical power converter used for monitoring the wavelength and the optical power in a fiber-optic communication system. The wavelength to optical power converter includes an input fiber pigtail for inputting an optical wavelength signal, a spiral fiber connected to the input fiber pigtail, a cylinder for fixing the spiral fiber, an output fiber pigtail extended from the spiral fiber, and an optical detector connected to the output fiber pigtail for reading a signal from the output fiber pigtail to generate the optical power, wherein the spiral fiber outputs the optical power in response to the optical wavelength signal, thereby performing a conversion from the wavelength into the optical power.

Preferably, the spiral fiber is wrapped around a fixed radius of the cylinder.

Preferably, the fixed radius of the cylinder is smaller than 10 mm when the optical wavelength signal is in the range between 750 nm and 1300 nm, and the fixed radius of the cylinder is more than 10 mm when the optical wavelength signal is in the range between 1300 nm and 1750 nm.

Preferably, the optical wavelength signal includes a wave-band range between 750 nm and 1750 nm.

Preferably, the optical wavelength signal is a monochromatic light source having a wave-band range between 750 nm and 1750 nm.

Preferably, the optical detector is an optical power reading device.

Preferably, the wavelength to optical power converter further includes a fluorescent sensing head and an optical sensor to form a medical sensor of a medical sensing system.

Preferably, the wavelength to optical power converter further includes a tunable light source, an optical sensor and a feedback control system of the optical power to form a stabilizing frequency network of a stabilized frequency system of a Wavelength Division Multiplexing (WDM) network.

Preferably, the wavelength to optical power converter further includes a tunable light source, an optical sensor and a processor with a corresponding relationship between the optical power to the wavelength to form a wavelength detecting system of a Wavelength Division Multiplexing (WDM) network for measuring the wavelength and monitoring the WDM network.

Preferably, the wavelength to optical power converter further includes a Wavelength Division Multiplexing (WDM) multiplexer, an optical access multiplexer, a Wavelength Division Multiplexing (WDM) demultiplexer, a first attenuator and a second attenuator and two Erbium-doped fiber amplifiers (EDFAs) to form a network attenuator of a Wavelength Division Multiplexing (WDM) network.

According to another aspect of the present invention, there is provided a method for converting a wavelength into an optical power used in a wavelength to optical power converter of a fiber-optic communication system, wherein the wavelength to optical power converter includes an input fiber pigtail, a spiral fiber, a cylinder, an output fiber pigtail and an optical detector. The method includes steps of inputting a specific wave-band monochromatic light source to the input fiber pigtail, measuring a bending loss of the spiral fiber, regulating a specific parameter and calculating a theory curve, and reading a signal via the optical detector to generate an optical power output signal.

Preferably, the specific wave-band monochromatic light source is in the range between 750 nm and 1750 nm.

Preferably, the specific parameter includes a bending radius, a winding number and a fiber-optic specification.

Preferably, the fiber-optic specification includes an admitted level of a fiber-optic to the bending loss thereof which is a variation of the bending loss against different spatial interferences.

Preferably, the theory curve is a mathematical equation which is a simulated semi-empirical theory curve obtained by getting actual input/output (I/O) values of the fiber-optic communication system and regulating the specific parameter for showing a conversion relationship between the wavelength and the optical power in different input/output (I/O) values.

Preferably, the mathematical equation is a general formula of $L(W)=\zeta_1 W^3+\zeta_2 W^2+\zeta_3 W+\zeta_4$, wherein $L(W)$ is a bending loss value, W is an input wavelength and $\zeta_{i(i=1,2,3,4)}$ is a specific parameter when the input wavelength is in the range between 750 nm and 1300 nm, and is a general formula of $L(W)=\zeta_1 N \exp(\theta_N+\zeta_2 W-\zeta_3 R)$, wherein L(W) is a bending loss value, W is an input wavelength, $\zeta_{i(i=1,2,3)}$ is a specific parameter, R is a bending radius, N is a winding number and $\theta_N$ is a winding angle when the input wavelength is in the range between 1300 nm and 1750 nm.

Preferably, the conversion relationship between the wavelength and the optical power is a mathematical equation of a relative curve of the bending loss and the input wavelength which is $L(W)=-2.118\times10^{-8}W^3+7.6504\times10^{-4}W^2-0.0936W+39.2805$, wherein L(W) is a bending loss value, W is an input wavelength when the input wavelength is in the range between 750 nm and 1300 nm, the winding number is 3 and the bending radius is 12.5 mm.

Preferably, the conversion relationship between the wavelength and the optical power is a mathematical equation of a relative curve of the bending loss and the wavelength which is $L(W)=-4.3102\times10^{-8}W^3+1.4356\times10^{-4}W^2-0.1653W+64.0322$, wherein L(W) is a bending loss value, W is an input wavelength when the input wavelength is in the range between 750 nm and 1300 nm, the winding number is 5 and the bending radius is 12.5 mm.

Preferably, the conversion relationship between the wavelength and the optical power is a mathematical equation of a relative curve of the bending loss and the wavelength which is $L(W)=-1.9511\times10^{-10}W^3-8.3908\times10^{-7}W^2-0.0014W+0.9694$, wherein L(W) is a bending loss value, W is an input wavelength when the input wavelength is in the range between 750 nm and 1300 nm, the winding number is 10 and the bending radius is 12.5 mm.

Preferably, the conversion relationship between the wavelength and the optical power is a mathematical equation of a relative curve of the bending loss and the wavelength which is $L(W)=-2.3069\times10^{-8}W^3+8.2415\times10^{-5}W^2-0.0996W+41.1952$, wherein L(W) is a bending loss value, W is an input wavelength when the input wavelength is in the range between 750 nm and 1300 nm, the winding number is 3 and the bending radius is 6.8 mm.

Preferably, the conversion relationship between the wavelength and the optical power is a mathematical equation of a relative curve of the bending loss and the wavelength which is $L(W)=-2.2554\times10^{8}W^3+8.1316\times10^{-5}W^2-0.0993W+41.5358$, wherein L(W) is a bending loss value, W is an input wavelength when the input wavelength is in the range between 750 nm and 1300 nm, the winding number is 5 and the bending radius is 6.8 mm.

Preferably, the conversion relationship between the wavelength and the optical power is a mathematical equation of a relative curve of the bending loss and the wavelength which is $L(W)=-2.7325\times10^{-8}W^3+9.6101\times10^{-5}W^2-0.1142W+46.6043$, wherein L(W) is a bending loss value, W is an input wavelength when the input wavelength is in the range between 750 nm and 1300 nm, the winding number is 7 and the bending radius is 6.8 mm.

Preferably, the conversion relationship between the wavelength and the optical power is a mathematical equation of a relative curve of the betiding loss and the wavelength which is $L(W)=-2.29\times10^{-8}W^3+8.1705\times10^{-5}W^2-0.0989W+41.1294$, wherein L(W) is a bending loss value, W is an input wavelength when the input wavelength is in the range between 750 nm and 1300 nm, the winding number is 10 and the bending radius is 6.8 mm.

Preferably, the conversion relationship between the wavelength and the optical power is a mathematical equation of a relative curve of the bending loss and the wavelength which is $L(W)=-1.6393\times10^{-8}W^3+6.2443\times10^{-5}W^2-0.0803W+35.2693$, wherein L(W) is a bending loss value, W is an input wavelength when the input wavelength is in the range between 750 nm and 1300 nm, the winding number is 13 and the bending radius is 6.8 mm.

Preferably, the conversion relationship between the wavelength and the optical power is a mathematical equation of a relative curve of the bending loss and the wavelength which is $L(W)=-1.7899\times10^{-8}W^3+6.6879\times10^{-5}W^2-0.0843W-36.3340$, wherein L(W) is a bending loss value, W is an input wavelength when the input wavelength is in the range between 750 nm and 1300 nm, the winding number is 15 and the bending radius is 6.8 mm.

Preferably, the conversion relationship between the wavelength and the optical power is a mathematical equation of a relative curve of the bending loss and the wavelength which is $L(W)=-2.2137\times10^{-8}W^3+7.9569\times10^{-5}W^2-0.0969W+40.4603$, wherein L(W) is a bending loss value, W is an input wavelength when the input wavelength is in the range between 750 nm and 1300 nm, the winding number is 18 and the bending radius is 6.8 mm.

Preferably, the conversion relationship between the wavelength and the optical power is a mathematical equation of a relative curve of the loss and the light source wavelength which is $L(W)=-3.3952\times10^{-8}W^3+1.1996\times10^{-4}W^2-0.1438W+59.2077$, wherein L(W) is a bending loss value, W is an input wavelength when the input wavelength is in the range between 750 nm and 1300 nm, the winding number is 20 and the bending radius is 6.8 mm.

According to a further aspect of the present invention, there is provided a wavelength to optical power converter used for measuring a wavelength. The wavelength to optical power converter includes an input fiber pigtail for inputting an optical wavelength signal, a spiral fiber connected to the input fiber pigtail, a cylinder for fixing the spiral fiber, an output fiber pigtail extended from the spiral fiber, and an optical detector connected to the output fiber pigtail for reading a signal from the output fiber pigtail to generate an optical power, wherein the spiral fiber outputs the optical power in response to the optical wavelength signal, thereby performing the conversion from the wavelength into the optical power.

The present invention may best be understood through the following descriptions with reference to the accompanying drawings, in which:

DETAILED DESCRIPTION OF THE PREFERRED EMBODIMENT

Figure 1:
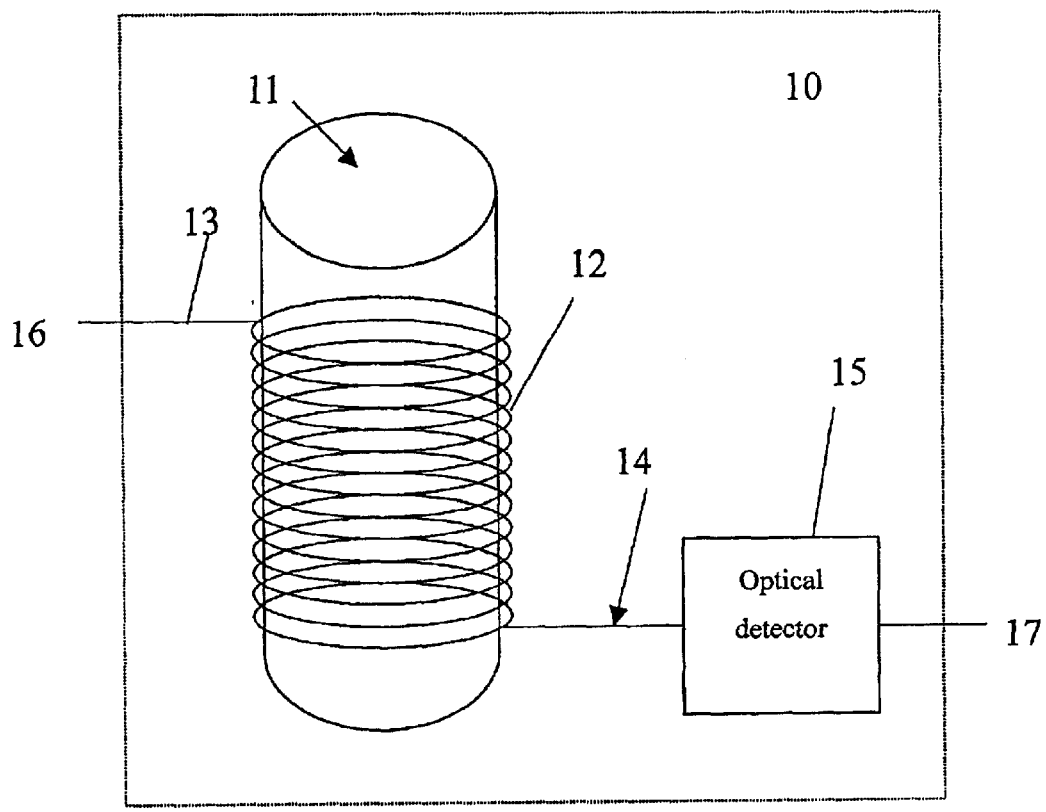
FIG. 1 is a schematic view showing a wavelength to optical power converter according to one embodiment of the present invention.

Please refer to FIG. 1, which is a schematic view showing a wavelength to optical power converter according to one embodiment of the present invention. A wavelength to optical power converter 10 includes an input fiber pigtail 13 for inputting an optical wavelength signal 16, a spiral fiber 12 connected to the input fiber pigtail 13, a cylinder 11 for fixing the spiral fiber 12, an output fiber pigtail 14 extended from the spiral fiber 12 and an optical detector 15 connected to the output fiber pigtail 14 for reading a signal (not shown) from the output fiber pigtail 14 to generate an optical power output signal 17, wherein the optical detector 15 is an optical power reading device. Moreover, the spiral fiber 12 is a single mode fiber-optic and the spiral fiber 12 is wrapped around a fixed radius of the cylinder 11. The fixed radius of the cylinder 11 is smaller than 10 mm when the optical wavelength signal 16 is in the range between 750 nm and 1300 nm. Furthermore, a wavelength to optical power conversion system according to one embodiment of the present application is performed by regulating an appropriate parameter and applying the spiral fiber 12 including a bending loss to output different output values in response to different optical wavelength signals.

Figure 2:
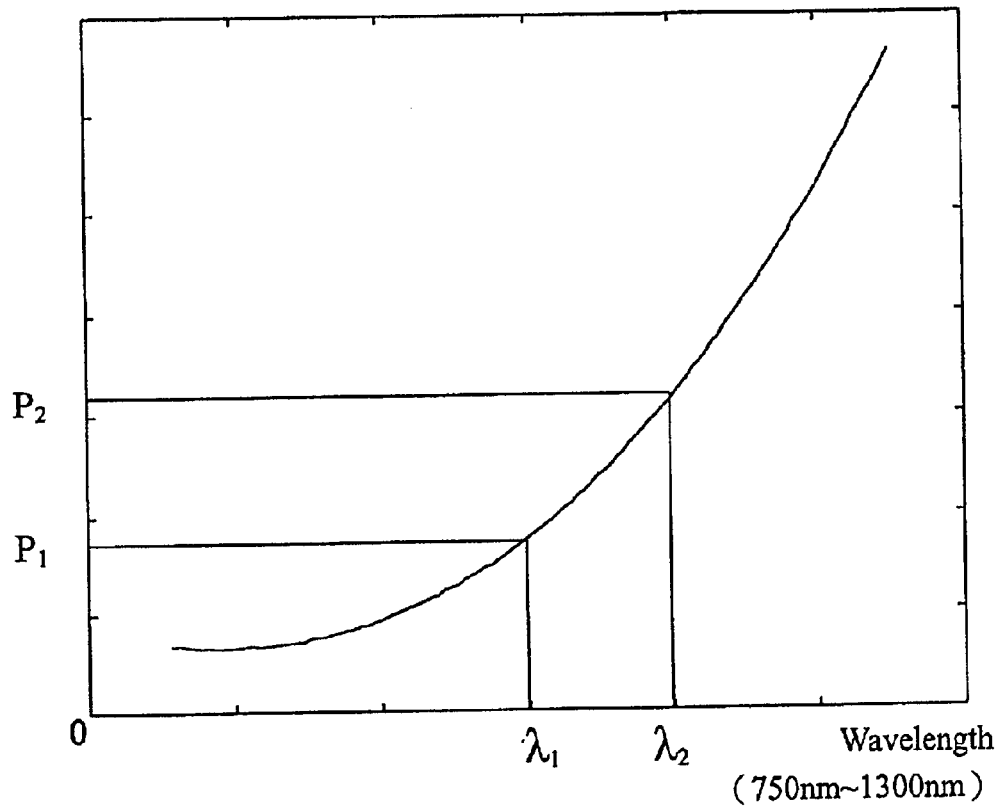
FIG. 2 is a schematic view showing a conversion principle of the wavelength to optical power converter according to one embodiment of the present invention.

Please refer to FIG. 2, which is a schematic view showing a conversion principle of the wavelength to optical power converter according to one embodiment of the present invention. The appropriate parameters include a bending radius, a winding number, a fiber-optic specification, and etc. The fiber-optic specification includes an admitted level of a fiber-optic to the bending loss thereof which is a variation of the bending loss against different spatial interferences. The bending loss generated by the spiral fiber 12 includes an apparent proportion variation of the conversion from the wavelength into the optical power, i.e. the wavelength is in direct proportion to the optical power, when the bending radius of the spiral fiber 12 is smaller than 10 mm. The more winding number of the spiral fiber 12 is, the more apparent the bending loss thereof is and the more sensitive the conversion from the wavelength into the optical power for a short-wavelength input signal is, which means that the winding number is in inverse proportion to the optical power. Consequently, various conversion relationships, those shown in FIGS. 5 to 15, between the wavelength and the optical power is achieved by regulating the appropriate parameters and referring a mathematical equation of the conversion from the wavelength into the optical power in different wave-band wavelength inputs according to FIG. 1. The mathematical equation is a general formula of $L(W) = \zeta_1 W^3 + \zeta_2 W^2 + \zeta_3 W + \zeta_4$, wherein $L(W)$ is a bending loss value, $W$ is an input wavelength and $\zeta_{i(i=1,2,3,4)}$ is a specific parameter when the optical input wavelength is in the range between 750 nm and 1300 nm.

Figure 3:
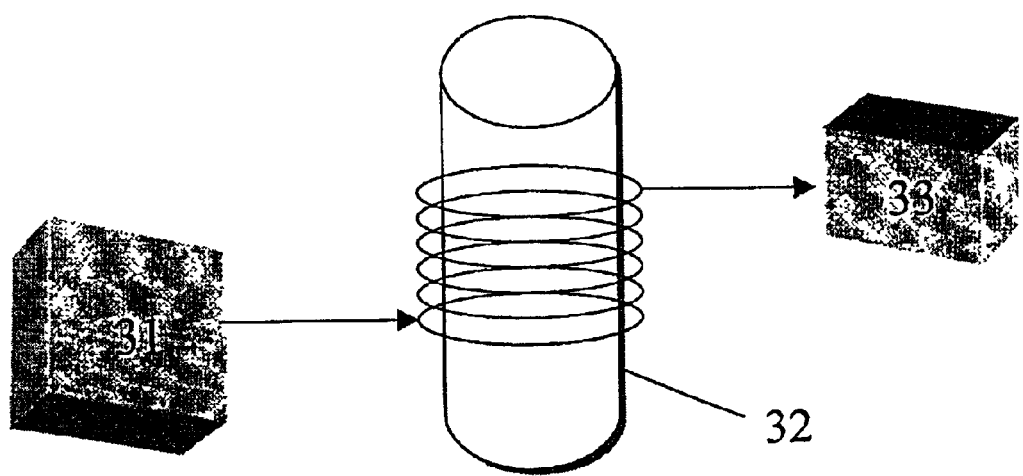
FIG. 3 is a schematic view showing a calibration measuring system of a conversion curve between the wavelength and the optical power according to one embodiment of the present invention.

Please refer to FIG. 3, which is a schematic view showing a calibration measuring system of a conversion curve between the wavelength and the optical power according to one embodiment of the present invention. A relative curve of the bending loss and the input wavelength is generated by practically measuring and sampling to modulate different parameters in order to verify the reliability and the compatibility between the actuality and the theory. The calibration measuring system includes a tunable monochromatic light source 31, a wavelength to optical power converter 32 and a spectrum analyzer 33, as shown in FIG. 3. The calibrating method includes the steps of inputting a wavelength signal from the tunable monochromatic light source 31 into the wavelength to optical power converter 32, and providing the spectrum analyzer 33 regarded as a signal reading device to read the wavelength signal.

Figure 4:
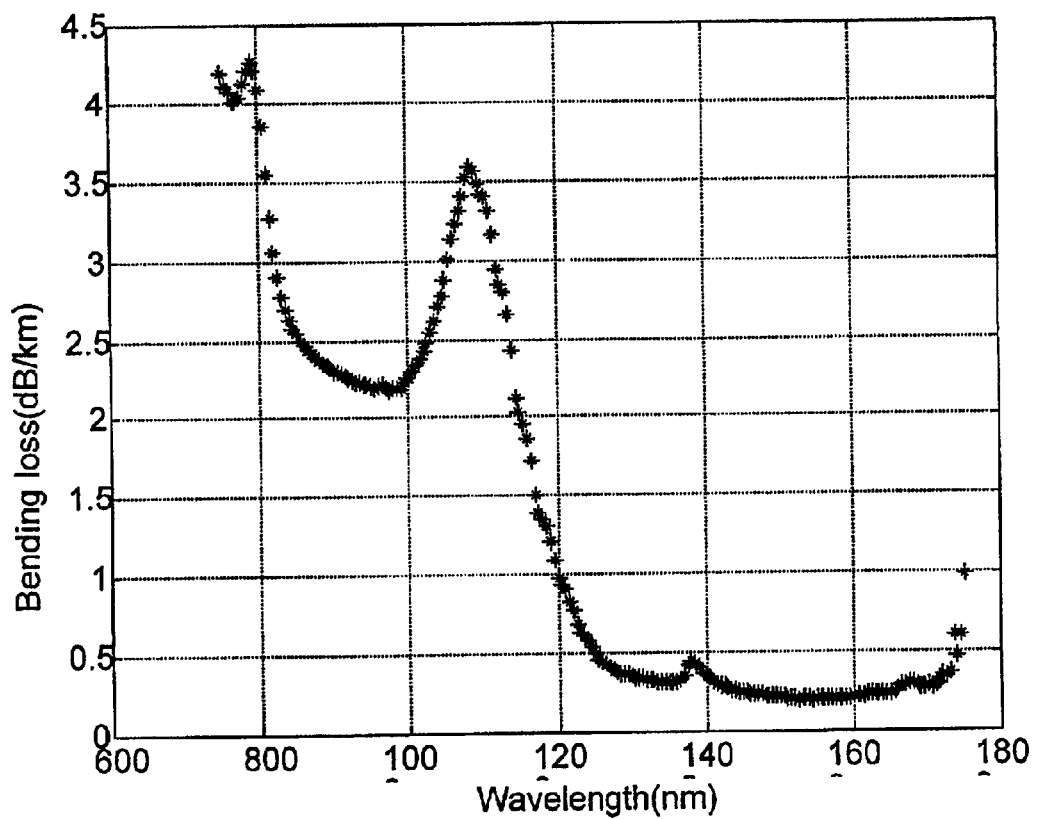
FIG. 4 is a plot showing a relative curve between the bending loss and the light source wavelength when the winding number is zero according to one embodiment of the present invention.

Please refer to FIG. 4, which is a plot showing a relative curve between the bending loss and the light source wavelength when the winding number is zero according to one embodiment of the present invention. When the winding number of the spiral fiber is zero, a fiber-optic loss of the spiral fiber is generated through a fiber-optic absorbent loss. Therefore, a corresponding optic-fiber curve without a one-to-one relationship is generated therewith. Moreover, a conversion curve including a one-to-one mapping relation between the wavelength and the optical power is obtained by modulating different parameters such as the winding number, the bending radius and the fiber-optic specification.

Figure 5:
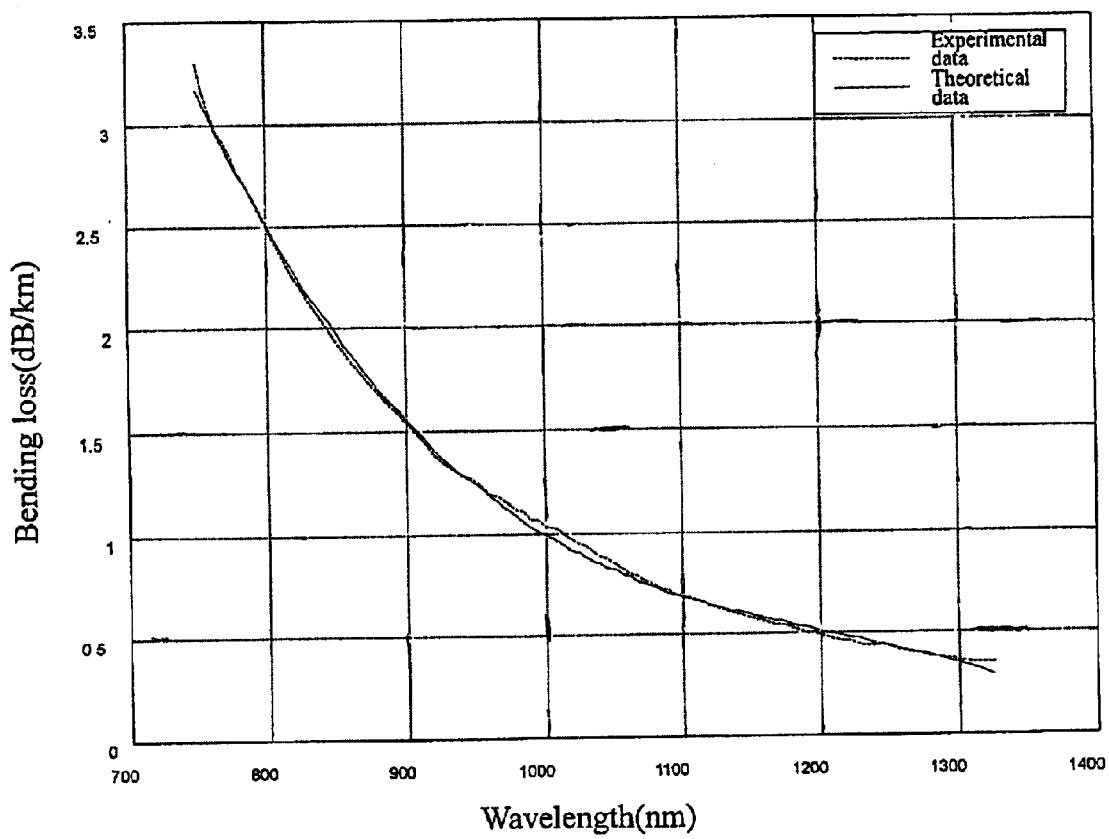
FIG. 5 is a plot showing a relative curve between the bending loss and the light source wavelength when the winding number is 3 and the bending radius is 12.5 mm according to one embodiment of the present invention.
Figure 6:
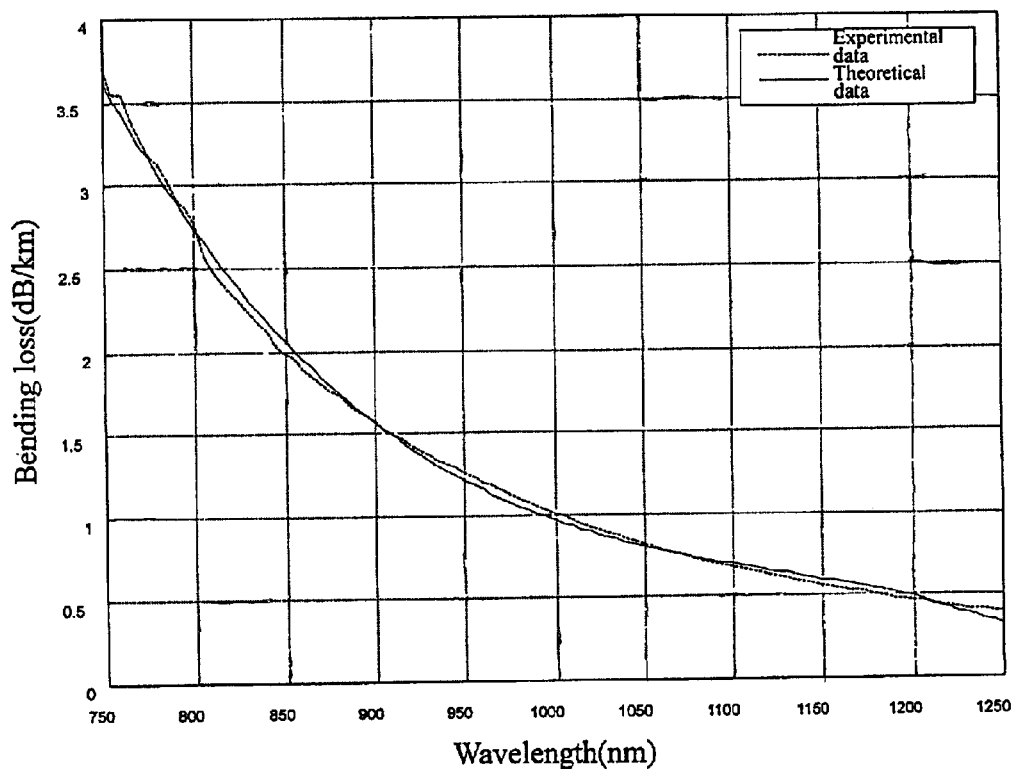
FIG. 6 is a plot showing a relative curve between the bending loss and the light source wavelength when the winding number is 5 and the bending radius is 12.5 mm according to one embodiment of the present invention.
Figure 7:
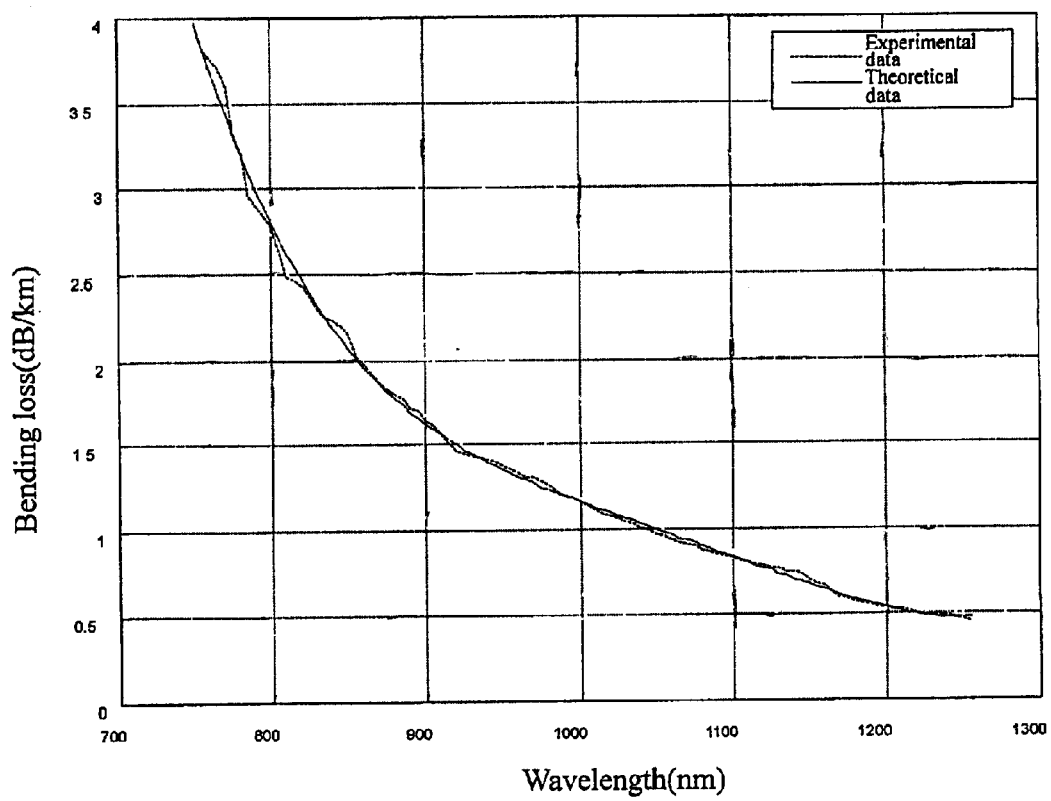
FIG. 7 is a plot showing a relative curve between the bending loss and the light source wavelength when the winding number is 10 and the bending radius is 12.5 mm according to one embodiment of the present invention.
Figure 8:
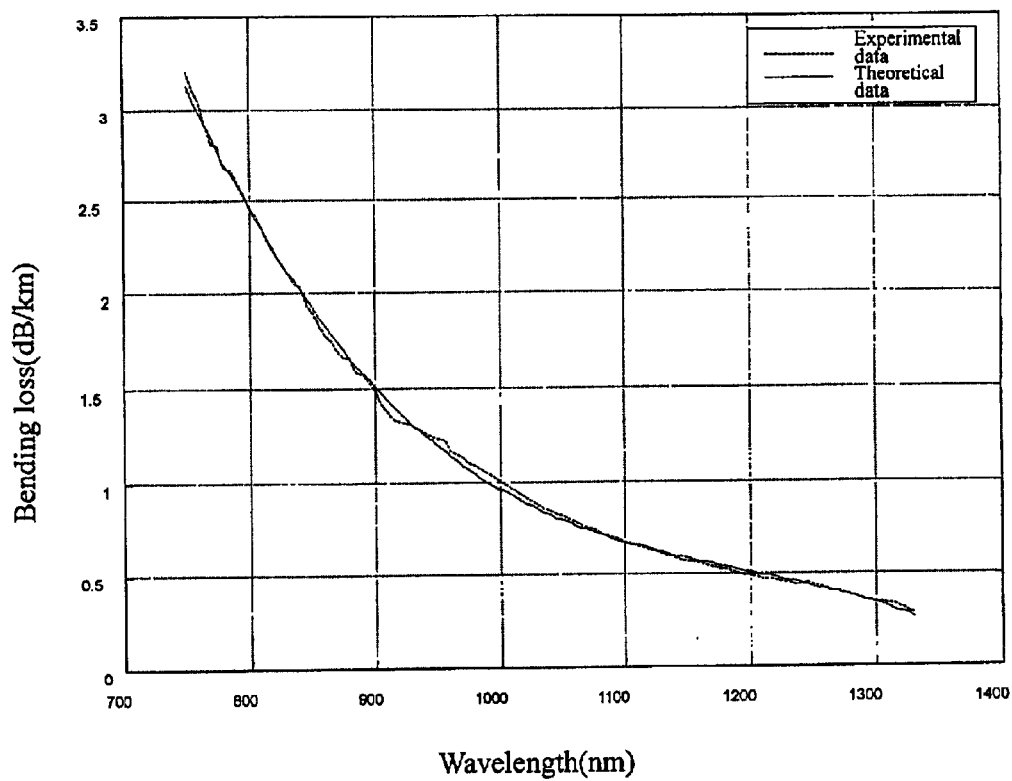
FIG. 8 is a plot showing a relative curve between the bending loss and the light source wavelength when the winding number is 3 and the bending radius is 6.8 mm according to one embodiment of the present invention.
Figure 9:
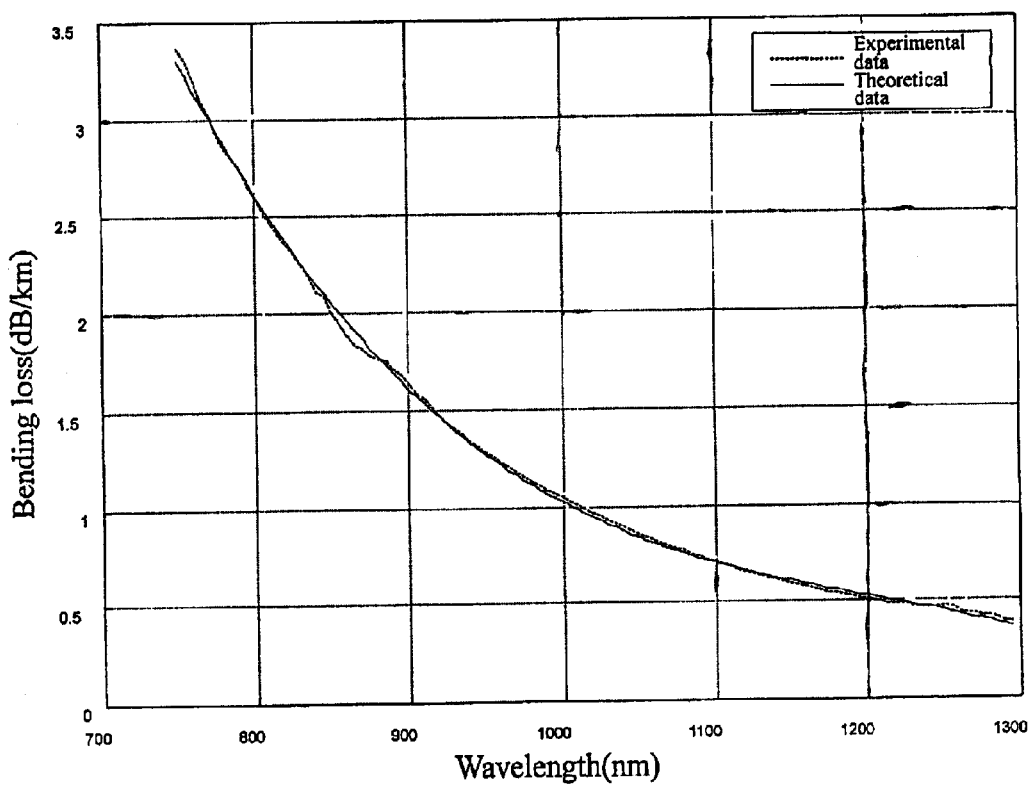
FIG. 9 is a plot showing a relative curve between the bending loss and the light source wavelength when the winding number is 5 and the bending radius is 6.8 mm according to one embodiment of the present invention.
Figure 10:
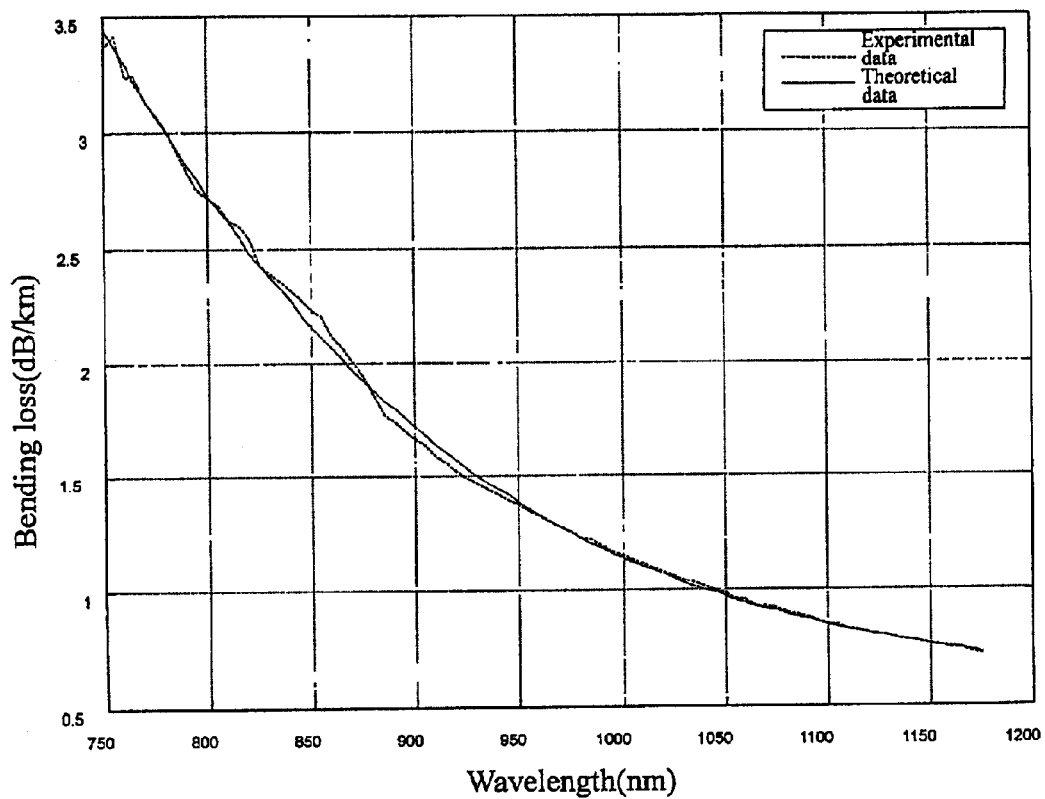
FIG. 10 is a plot showing a relative curve between the bending loss and the light source wavelength when the winding number is 7 and the bending radius is 6.8 mm according to one embodiment of the present invention.
Figure 11:
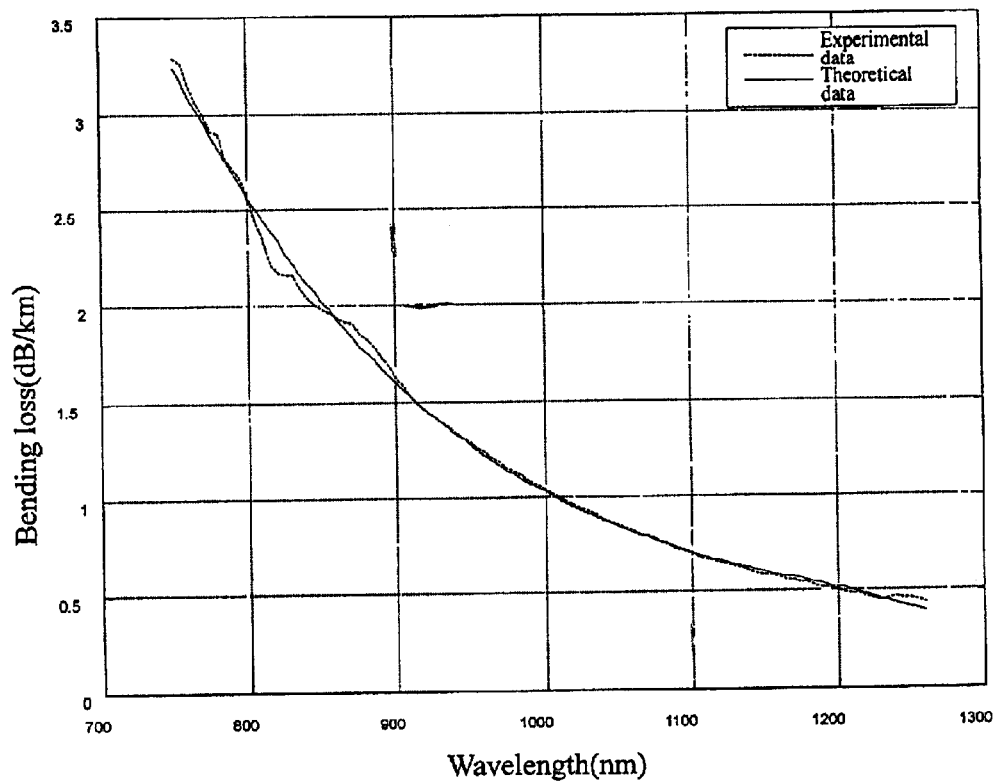
FIG. 11 is a plot showing a relative curve between the bending loss and the light source wavelength when the winding number is 10 and the bending radius is 6.8 mm according to one embodiment of the present invention.
Figure 12:
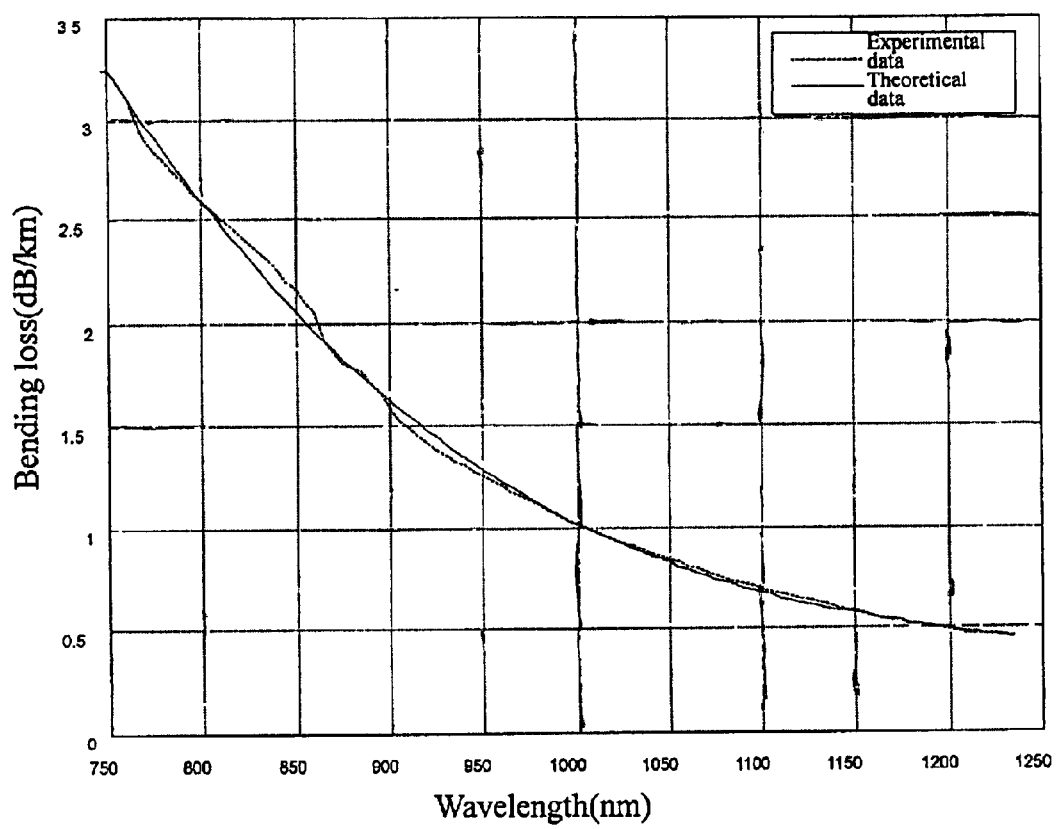
FIG. 12 is a plot showing a relative curve between the bending loss and the light source wavelength when the winding number is 13 and the bending radius is 6.8 mm according to one embodiment of the present invention.
Figure 13:
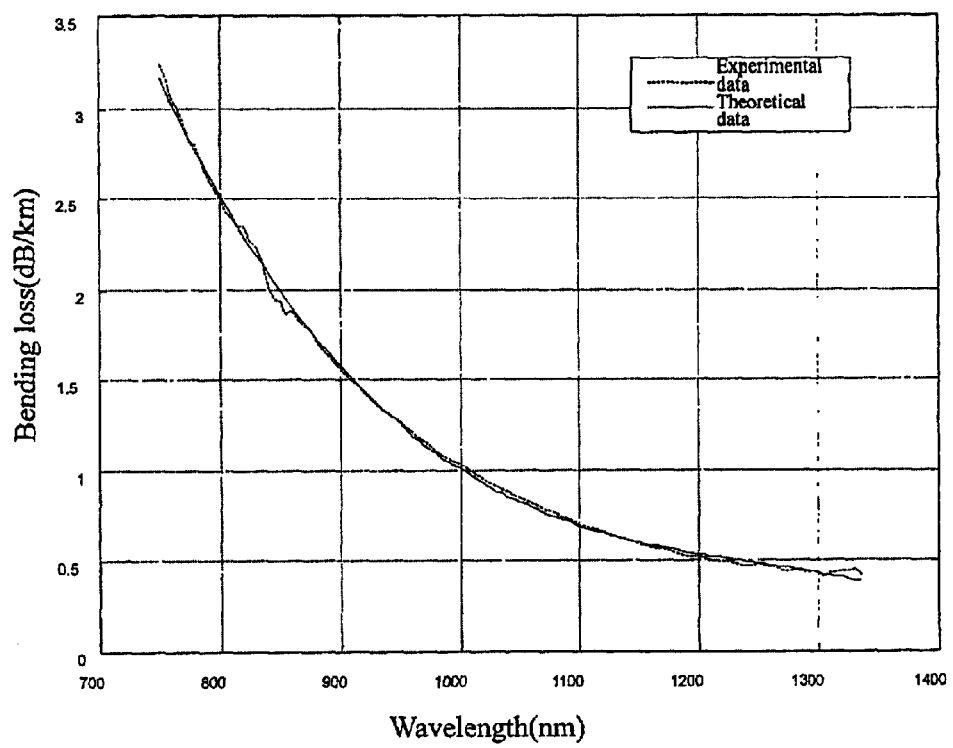
FIG. 13 is a plot showing a relative curve between the bending loss and the light source wavelength when the winding number is 15 and the bending radius is 6.8 mm according to one embodiment of the present invention.
Figure 14:
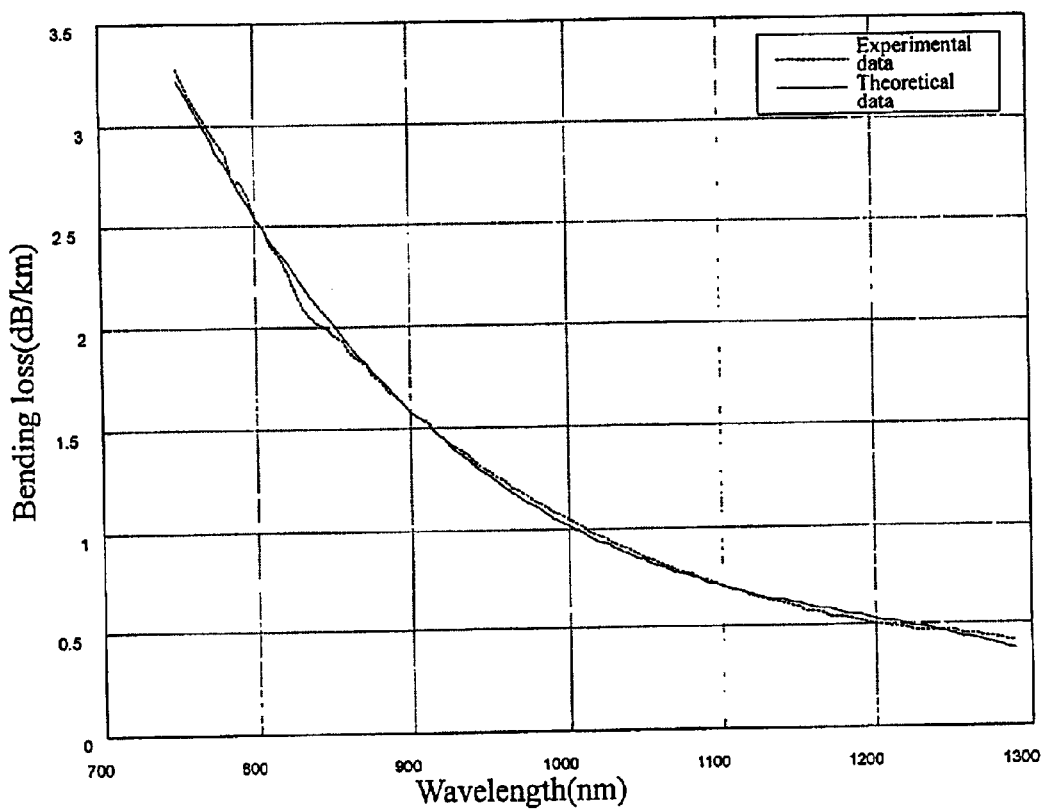
FIG. 14 is a plot showing a relative curve between the bending loss and the light source wavelength when the winding number is 18 and the bending radius is 6.8 mm according to one embodiment of the present invention.
Figure 15:
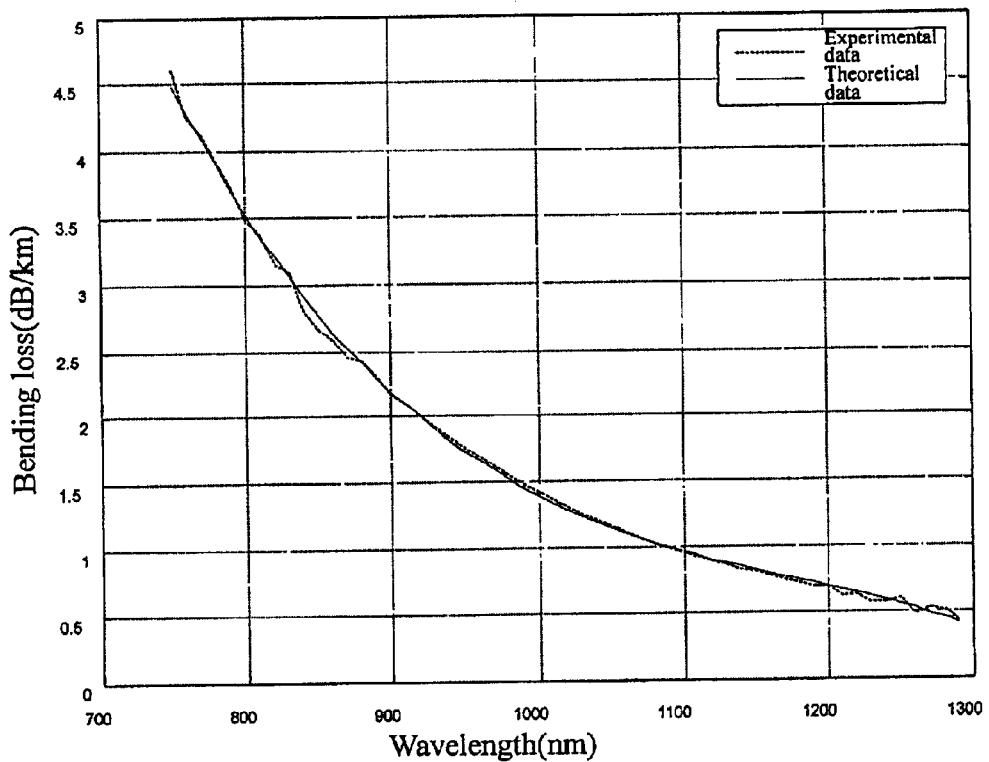
FIG. 15 is a plot showing a relative curve between the bending loss and the light source wavelength when the winding number is 20 and the bending radius is 6.8 mm according to one embodiment of the present invention.

Please refer to FIGS. 5 to 15, which are plots respectively showing the relative curve between the bending loss and the light source wavelength by respectively regulating different winding numbers and different bending radiuses according to one embodiment of the present invention. Furthermore, the conversion relationship between the wavelength and the optical power is a mathematical equation of a relative curve of the bending loss and the input wavelength which is $L(W)=-2.118\times10^{-8}W^3+7.6504\times10^{-4}W^2-0.0936W+39.2805$, wherein L(W) is a bending loss value, W is an input wavelength when the input wavelength is in the range between 750 nm and 1300 nm, the winding number is 3 and the bending radius is 12.5 mm, as shown in FIG. 5. When the winding number is 5 and the bending radius is 12.5 mm, a relative curve of the bending loss and the wavelength is a mathematical equation of $L(W)=-4.3102\times10^{-8}W^3+1.4356\times10^{-4}W^2-0.1653W+64.0322$, as shown in FIG. 6. When the winding number is 10 and the bending radius is 12.5 mm, a relative curve of the bending loss and the wavelength is a mathematical equation of $L(W)=-1.9511\times10^{-10}W^3-8.3908\times10^{-7}W^2-0.0014W+0.9694$, as shown in FIG. 7. When the winding number is 3 and the bending radius is 6.8 mm, a relative curve of the bending loss and the wavelength is a mathematical equation of $L(W)=-2.3069\times10^{-8}W^3+8.2415\times10^{-5}W^2-0.0996W+41.1952$, as shown in FIG. 8. FIG. 9 shows a relative curve of the bending loss and the wavelength which is a mathematical equation of $L(W)=-2.2554\times10^{-8}W^3+8.1316\times10^{-5}W^2-0.0993W+41.5358$ when the winding number is 5 and the bending radius is 6.8 mm. A relative curve of the bending loss and the wavelength is a mathematical equation of $L(W)=-2.7325\times10^{-8}W^3+9.6101\times10^{-5}W^2-0.1142W+46.6043$, as shown in FIG. 10, when the winding number is 7 and the bending radius is 6.8 mm. When the winding number is 10 and the bending radius is 6.8 mm, a relative curve of the bending loss and the wavelength is a mathematical equation of $L(W)=-2.29\times10^{-8}W^3+8.1705\times10^{-5}W^2-0.0989W+41.1294$, as shown in FIG. 11. When the winding number is 13 and the bending radius is 6.8 mm, a relative curve of the bending loss and the wavelength is a mathematical equation of $L(W)=-1.6393\times10^{-8}W^3+6.2443\times10^{-5}W^2-0.0803W+35.2693$, as shown in FIG. 12. When the winding number is 15 and the bending radius is 6.8 mm, a relative curve of the bending loss and the wavelength is a mathematical equation of $L(W)=-1.7899\times10^{-8}W^3+6.6879\times10^{-5}W^2-0.0843W-36.3340$, as shown in FIG. 13. When the winding number is 18 and the bending radius is 6.8 mm, a relative curve of the bending loss and the wavelength is a mathematical equation of $L(W)=-2.2137\times10^{-8}W^3+7.9569\times10^{-5}W^2-0.0969W+40.4603$, as shown in FIG. 14. When the winding number is 20 and the bending radius is 6.8 mm, a relative curve of the loss and the light source wavelength is a mathematical equation of $L(W)=-3.3952\times10^{-8}W^3+1.1996\times10^{-4}W^2-0.1438W+59.2077$, as shown in FIG. 15.

Figure 16:
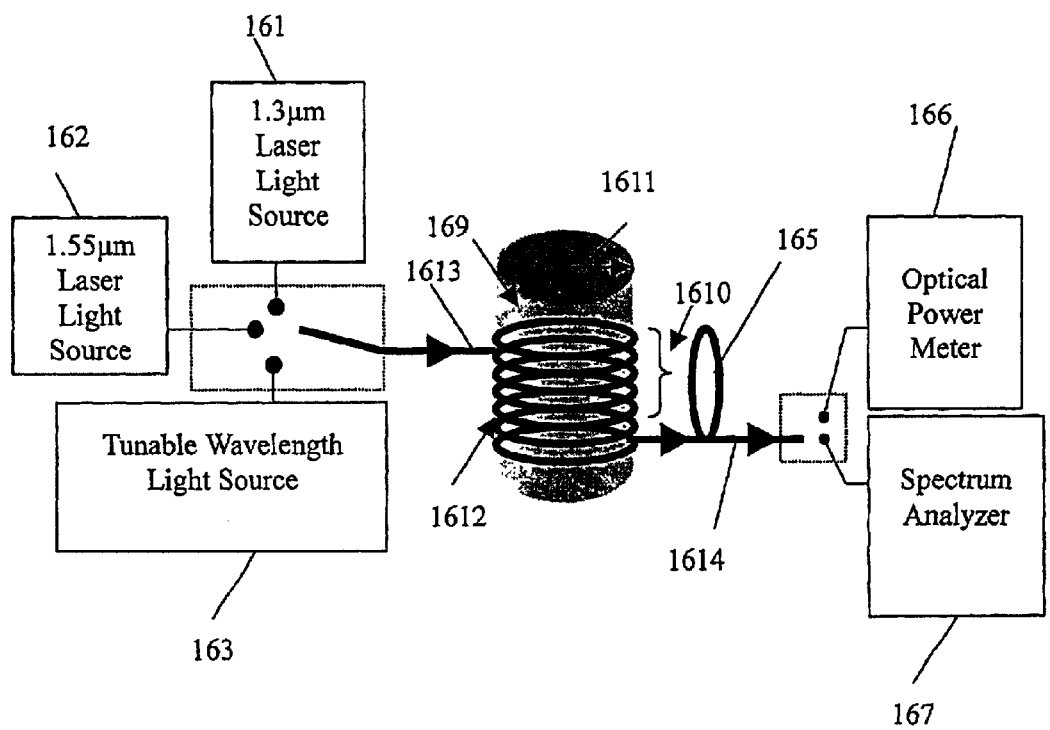
FIG. 16 is a schematic view showing a calibration measuring system of a conversion curve between the wavelength and the optical power in the range between 1300 nm and 1750 nm according to another embodiment of the present invention.
Figure 17:
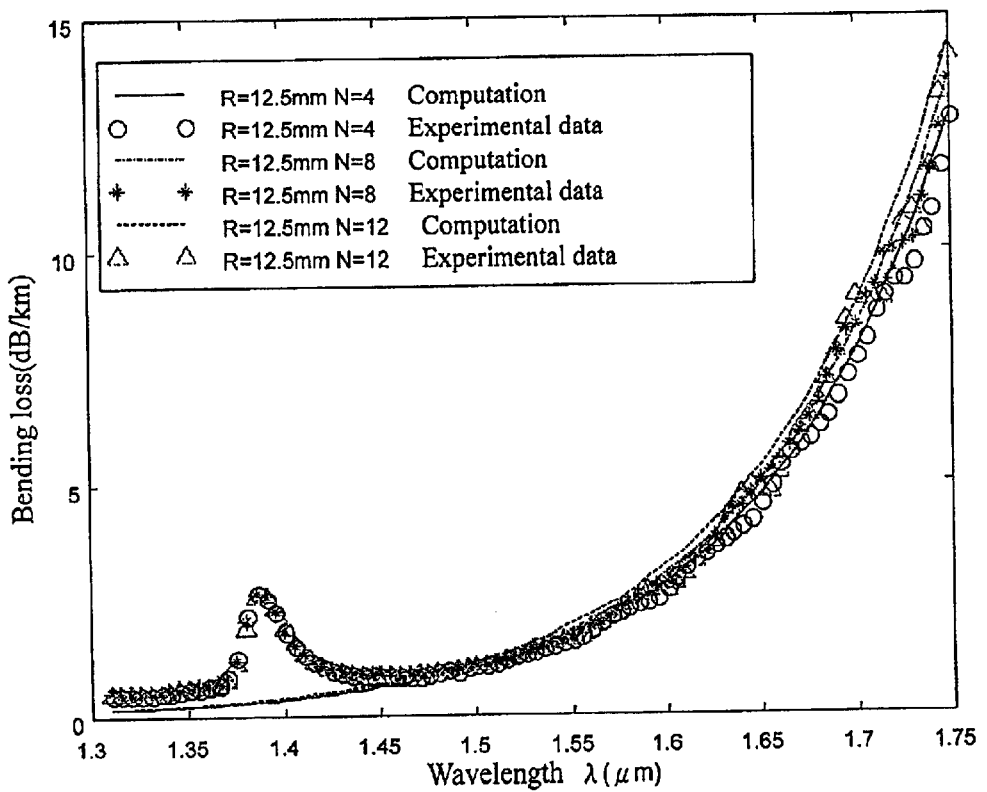
FIG. 17 is a plot showing a relative curve between the bending loss and the light source wavelength in the range between 1300 nm and 1750 nm when the winding numbers are 4, 8 and 12, respectively, and the bending radius is 12.5 mm according to another embodiment of the present invention.

Please to refer to FIG. 16, which is a calibration measuring system of a conversion curve between the wavelength and the optical power in the range between 1300 nm and 1750 nm according to another embodiment of the present invention. A wavelength to optical power conversion system according to the present application is performed by combining appropriately adjusted parameters and applying the response of the fiber-optic (165 and 1612) with respected to the bending loss to output different output values 1614 in response to different optical wavelength input signals 1613 from different light sources, i.e. a 1.31 μm laser light source 161, a 1.55 μm laser light source 162 and a tunable wavelength light source between 1.31 μm and 1.75 μm 163. The appropriate parameters include a bending radius 1611, a winding number 1610, a fiber-optic specification, and etc. The fiber-optic specification includes an admitted level of the fiber-optic (165 and 1612), to the bending loss thereof which is a variation of the bending loss against different spatial interferences. The bending loss generated by the spiral fiber 1612 includes an apparent proportion variation of the conversion from the wavelength into the optical power, i.e. the wavelength is in inverse proportion to the optical power, when the bending radius 1611, i.e. a radius of a cylinder 169, of the spiral fiber 1612 is more than 10 mm. The more winding number 1610 of the spiral fiber 1612 is, the more apparent the bending loss thereof is and the more sensitive the conversion from the wavelength into the optical power for a long-wavelength input signal is, which means that the winding number 1610 is in inverse proportion to the optical power. Moreover, a calibrating system is provided by inputting the optical wavelength input signal 1613 into the spiral fiber 1612 wrapped around the cylinder 169 and using an optical power meter 166 or a spectrum analyzer 167 regarded as a signal reading device to read the output signal 1614 from spiral fiber 1612. Consequently, a conversion relationship between the wavelength and the optical power is achieved by regulating the appropriate parameters and referring a mathematical equation of the conversion from the wavelength into the optical power in different wave-band input wavelength signals (161, 162, 163), as shown in FIG. 17. The mathematical equation is a general formula of $L(W)=\zeta_1 N \exp(\theta_N+\zeta_2 W-\zeta_3 R)$, wherein L(W) is a bending loss value, W is an input wavelength, $\zeta_{i(i=1,2,3)}$ is a specific parameter, R is a bending radius, N is a winding number and $\theta_N$ is a winding angle when the specific input wavelength is in the range between 1300 nm and 1750 nm. Furthermore, FIG. 17 is a plots showing a relative curve between the bending loss and the light source wavelength in the range between 1300 nm and 1750 nm when the winding numbers are 4, 8 and 12, respectively, and the bending radius is 12.5 mm according to another embodiment of the present invention.

As for the application of the corresponding relationship between the wavelength and the optical power according to the present invention, further descriptions are as follows.

Figure 18:
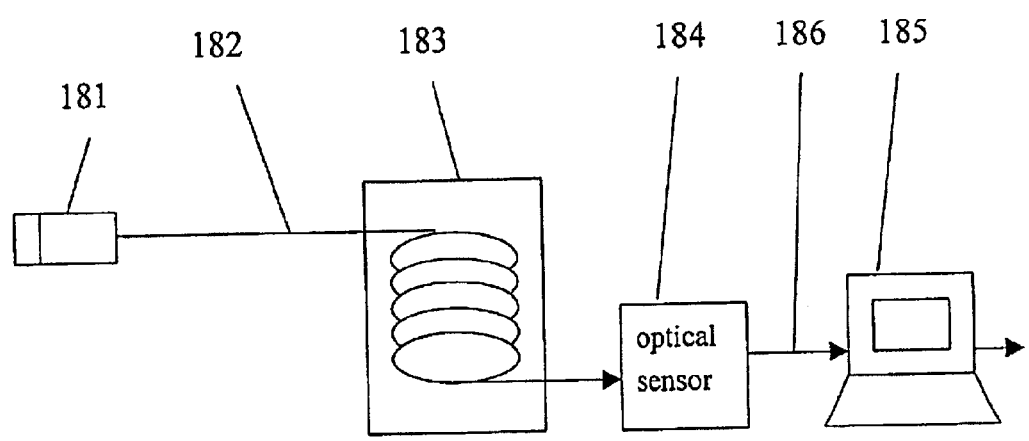
FIG. 18 is a schematic view showing a medical sensor according to the present invention.

Please refer to FIG. 18, which is a schematic view showing a medical sensor according to the present invention. The corresponding relationship between the wavelength and the optical power is used for a medical sensor in a medical sensing system. An input signal 182 from a fluorescent sensing head 181 is received by a wavelength to optical power converter 183, and an output signal 186 is generated by an optical sensor 184 to output to a personal computer 185 for reading.

Figure 19:
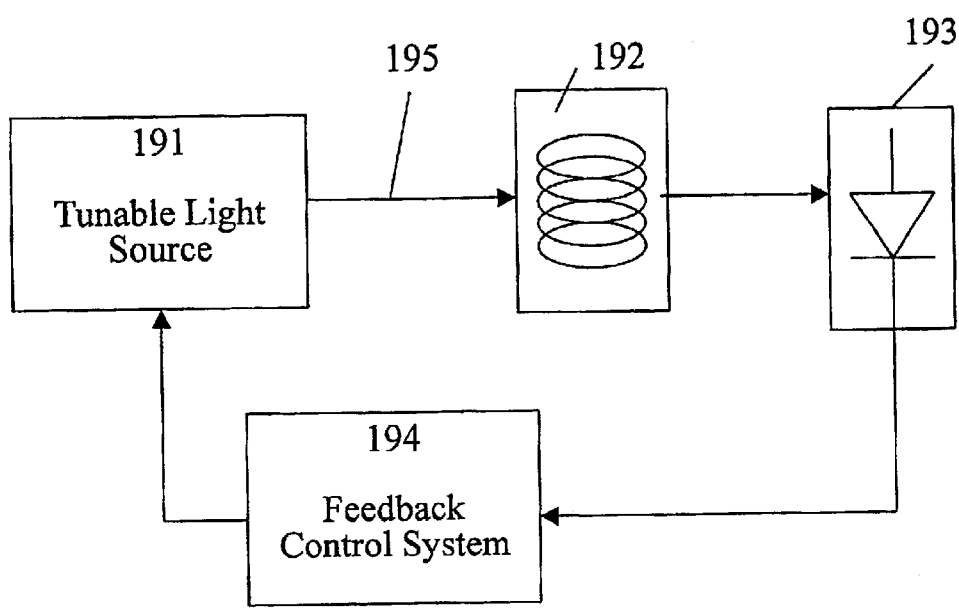
FIG. 19 is a schematic view showing a stabilized frequency system according to the present invention.

Please refer to FIG. 19, which is a schematic view showing a stabilized frequency system according to the present invention. The corresponding relationship between the wavelength and the optical power is used for stabilizing the frequency of a Wavelength Division Multiplexing (WDM) network in a stabilized frequency system of the WDM network. An input signal 195 from a tunable light source 191 is received by a wavelength to optical power converter 192 and then is processed by an optical detector 193 and is controlled by a feedback control system of the optical power 194 to generate a stabilizing frequency effect.

Figure 20:
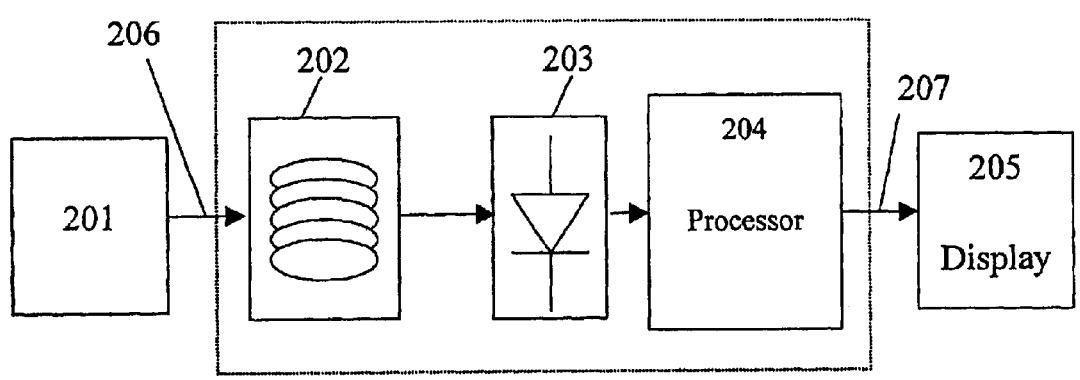
FIG. 20 is a schematic view showing a wavelength measuring system according to the present invention.

Please refer to FIG. 20, which is a schematic view showing a wavelength measuring system according to the present invention. The corresponding relationship between the wavelength and the optical power is used for measuring the wavelength and monitoring a Wavelength Division Multiplexing (WDM) network in a wavelength detecting system of the WDM network. An input signal 206 from a tunable light source 201 is received by a wavelength to optical power converter 201, and then is processed by an optical sensor 203 and a processor with a corresponding relationship between the optical power and the wavelength 204 to generate an output signal 207 to be shown in a display 205.

Figure 21:
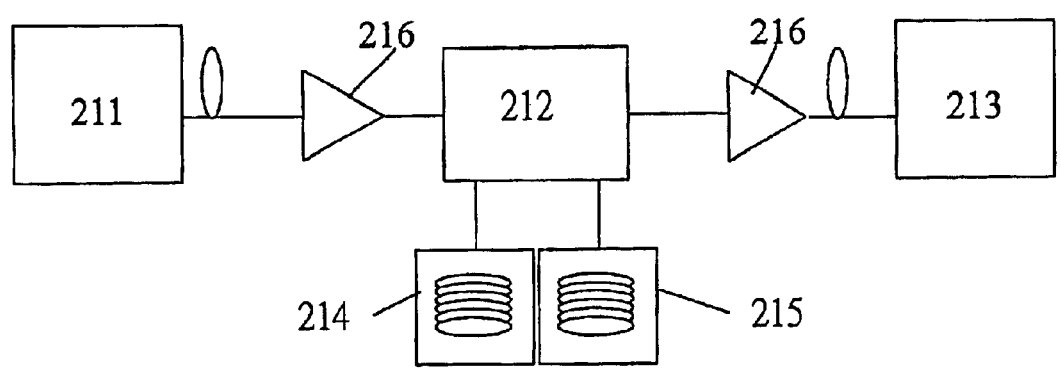
FIG. 21 is a schematic view showing a network attenuator of a Wavelength Division Multiplexing (WDM) network according to the present invention.

Please refer to FIG. 21, which is a schematic view showing a network attenuator of a Wavelength Division Multiplexing (WDM) network according to the present invention. The corresponding relationship between the wavelength and the optical power is used for a network attenuator in a Wavelength Division Multiplexing (WDM) network. The network attenuator includes a Wavelength Division Multiplexing (WDM) multiplexer 211, an optical access multiplexer 212, a Wavelength Division Multiplexing (WDM) demultiplexer 213, a first attenuator 214 and a second attenuator 215 and two Erbium-doped fiber amplifiers (EDFAs) 216.

In conclusion, a signal conversion of an incident monochromatic light from the wavelength into optical power is achieved by applying the characteristics that the fiber-optic includes a bending loss and outputs different bending losses in response to different wavelength light source signals by regulating appropriate parameters according to the present invention. The present invention includes a simple components assembly, has a lower cost and is easily operated in an applied wave-band with 750 nm to 1750 nm. Therefore, the present invention is used in a regional broadband fiber-optic network and also can be used for a wavelength monitoring or protecting system with a multi-wave-band, multi-array and/or multi-channel network, a stabilizing frequency control system with a multi-wave-band, multi-array and/or multi-channel network, or for an attenuator with a multi-wave-band, multi-array and/or multi-channel network.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A wavelength to optical power converter used for monitoring the wavelength and the optical power in a fiber-optic communication system, comprising:

an input fiber pigtail for inputting an optical wavelength signal;

a cylinder for fixing said spiral fiber;

a spiral fiber connected to said input fiber pigtail and wrapped around said fixed radius of said cylinder;

an output fiber pigtail extended from said spiral fiber; and an optical detector connected to said output fiber pigtail for reading a signal from said output fiber pigtail to generate said optical power, wherein said fixed radius of said cylinder is smaller than 10 mm when maid optical wavelength signal is in the range between 750 nm and 1300 nm, and said fixed radius of said cylinder is more than 10 mm when said optical wavelength signal is in the range between 1300 nm and 1750 nm, and wherein said spiral fiber outputs said optical power in response to said optical wavelength signal, thereby performing a conversion from said wavelength into said optical power.

2. The wavelength to optical power converter according to claim 1, wherein said optical wavelength signal includes a wave-band range between 750 nm and 1750 nm.

3. The wavelength to optical power converter according to claim 1, wherein said optical wavelength signal is a monochromatic light source having a wave-band range between 750 nm and 1750 nm.

4. The wavelength to optical power converter according to claim 1, wherein said optical detector is an optical power reading device.

5. The wavelength to optical power converter according to claim 1, further comprising a fluorescent sensing head and an optical sensor to form a medical sensor of a medical sensing system.

6. The wavelength to optical power converter according to claim 1, further comprising a tunable light source, an optical sensor and a feedback control system of said optical power to form a stabilizing frequency network of a stabilized frequency system of a Wavelength Division Multiplexing (WDM) network.

7. The wavelength to optical power converter according to claim 1, further comprising a tunable light source, an optical sensor and a processor with a corresponding relationship between said optical power and said wavelength to form a wavelength detecting system of a Wavelength Division Multiplexing (WDM) network for measuring said wavelength and monitoring said WDM network.

8. The wavelength to optical power converter according to claim 1, further comprising a Wavelength Division Multiplexing (WDM) multiplexer, an optical access multiplexer, a Wavelength Division Multiplexing (WDM) demultiplexer, a first attenuator and a second attenuator and two Erbium-doped fiber amplifiers (EDFAs) to form a network attenuator of a Wavelength Division Multiplexing (WDM) network.

9. A method for converting a wavelength into an optical power used in a wavelength to optical power converter of a fiber-optic communication system, wherein said wavelength to optical power converter includes an input fiber pigtail, a cylinder having a fixed radius, a spiral fiber wrapped around said fixed radius of said cylinder, an output fiber pigtail and an optical detector, comprising the steps of:

inputting a specific wave-band monochromatic light source to said input fiber pigtail;

measuring a bending loss of said spiral fiber;

regulating a specific parameter and calculating a theory curve; and reading a signal via said optical detector to generate an optical power output signal, wherein said fixed radius of said cylinder is smaller than 10 mm when said optical wavelength signal is in the range between 750 nm and 1300 nm, and said fixed radius of said cylinder is greater than 10 mm when said optical wavelength signal is in the range between 1300 nm and 1750 nm.

10. The method according to claim 9, wherein said specific wave-band monochromatic light source is in the range between 750 nm and 1750 nm.

11. The method according to claim 9, wherein said specific parameter includes a bending radius, a winding number and a fiber-optic specification.

12. The method according to claim 11, wherein said fiber-optic specification includes an admitted level of a fiber-optic to said bonding loss thereof which is a variation of said bending loss against different spatial interferences.

13. The method according to claim 11, wherein said theory curve is a mathematical equation which is a simulated semi-empirical theory curve obtained by getting actual input/output (I/O) values of said fiber-optic communication system and regulating said specific parameter for showing a conversion relationship between said wavelength and said optical power in different input/output (I/O) values.

14. The method according to claim 13, wherein said mathematical equation is a general formula of $L(W)=\zeta_1 W^3+\zeta_2 W^2+\zeta_3 W+\zeta_4$, wherein $L(W)$ is a bending loss value, W is an input wavelength and $\zeta_{i(i=1,2,3,4)}$ is a specific parameter when said input wavelength is in the range between 750 nm and 1300 nm, and is a general formula of $L(W)=\zeta_1 N \exp(\theta_N+\zeta_2 W-\zeta_3 R)$, wherein $L(W)$ is a bending loss value, W is an input wavelength, $\zeta_{i(i=1,2,3)}$ is a specific parameter, R is a bending radius, N is a winding number and $\theta_N$ is a winding angle when said input wavelength is in the range between 1300 nm and 1750 nm.

15. The method according to claim 13, wherein said conversion relationship between said wavelength and said optical power is a mathematical equation of a relative curve of said bending loss and said input wavelength which is $L(W)=-2.118\times10^{-8}W^3+7.6504\times10^{-4}W^2-0.0936W+39.2805$, wherein $L(W)$ is a bending loss value, W is an input wavelength when said input wavelength is in the range between 750 nm and 1300 nm, said winding number is 3 and said bending radius is 12.5 mm.

16. The method according to claim 13, wherein said conversion relationship between said wavelength and said optical power is a mathematical equation of a relative curve of said bending loss and said wavelength which is $L(W)=-4.3102\times10^{-8}W^3+1.4356\times10^4 W^2-0.1653W+64.0322$, wherein $L(W)$ is a bending loss value, W is an input wavelength when said input wavelength is in the range between 750 nm and 1300 nm, said winding number is 5 and said bending radius is 12.5 mm.

17. The method according to claim 13, wherein said conversion relationship between said wavelength and said optical power is a mathematical equation of a relative curve of said bending lass and said wavelength which is $L(W)=-1.9511\times10^{-10}W^3-8.3908\times10^7 W^2-0.0014W+0.9694$, wherein $L(W)$ is a bending loss value, W is an input wavelength when said input wavelength is in the range between 750 nm and 1300 nm, said winding number is 10 and said bending radius is 12.5 mm.

18. The method according to claim 13, wherein said conversion relationship between said wavelength and said optical power is a mathematical equation of a relative curve of said bending loss and said wavelength which is $L(W)=-2.3069\times10^{-8}W^3 8.2415\times10^{-5}W^2-0.0996W+41.1952$, wherein $L(W)$ is a bending loss value, W is an input wavelength when said input wavelength is in the range between 750 nm and 1300 nm, said winding number is 3 and said bending radius is 6.8 mm.

19. The method according to claim 13, wherein said conversion relationship between said wavelength and said optical power is a mathematical equation of a relative curve of said bending loss and said wavelength which is $L(W)=-2.2554\times10^{-8}W^3+8.1316\times10^{-5}W^2-0.0993W+41.5358$, wherein $L(W)$ is a bending loss value, W is an input wavelength when said input wavelength is in the range between 750 nm and 1300 nm, said winding number is 5 and said bending radius is 6.8 mm.

20. The method according to claim 13, wherein said conversion relationship between said wavelength and said optical power is a mathematical equation of a relative curve of said bending loss and said wavelength which is $L(W)=2.7325\times10^{-8}W^3+9.6101\times10^{-5}W^2-0.1142W+46.6043$, wherein $L(W)$ is a bending loss value, W is an input wavelength when said input wavelength is in the range between 750 nm and 1300 nm, said winding number is 7 and said bending radius is 6.8 mm.

21. The method according to claim 13, wherein said conversion relationship between said wavelength and said optical power is a mathematical equation of a relative curve of said betiding loss and said wavelength which is $L(W)=-2.29\times10^{-8}W^3+8.1705\times10^{-5}W^2-0.0989W+41.1294$, wherein $L(W)$ is a bending loss value, W is an input wavelength when said input wavelength is in the range between 750 nm and 1300 nm, said winding number is 10 and said bending radius is 6.8 mm.

22. The method according to claim 13, wherein said conversion relationship between said wavelength and said optical power is a mathematical equation of a relative curve of said bending loss and said wavelength which is $L(W)=-1.6393\times10^{-8}W^3+6.2443\times10^{-5}W^2-0.0803W+35.2693$, wherein $L(W)$ is a bending loss value, W is an input wavelength when said input wavelength is in the range between 750 nm and 1300 nm, said winding number is 13 and said bending radius is 6.8 mm.

23. The method according to claim 13, wherein said conversion relationship between said wavelength and said optical power is a mathematical equation of a relative carve of said bending loss and said wavelength which is $L(W)=-1.7899\times10^{-8}W^3+6.6879\times10^{-5}W^2-0.0843W-36.3340$, wherein $L(W)$ is a bending loss value, W is an input wavelength when said input wavelength is in the range between 750 nm and 1300 nm, said winding number is 15 and said bending radius is 6.8 mm.

24. The method according to claim 13, wherein said conversion relationship between said wavelength and said optical power is a mathematical equation of a relative curve of said bending loss and said wavelength which is $L(W)=-2.2137\times10^{-8}W^3+7.9569\times10^{-5}W^2-0.0969W+40.4603$, wherein $L(W)$ is a bending-loss value, W is an input wavelength when said input wavelength is in the range between 750 nm and 1300 nm, said winding number is 18 and said bending radius is 6.8 mm.

25. The method according to claim 13, wherein said conversion relationship between said wavelength and said optical power is a mathematical equation of a relative curve of said loss and said light source wavelength which is $L(W)=-3.3952\times10^{-8}W^3+1.1996\times10^{-4}W^2-0.1438W+59.2077$, wherein $L(W)$ is a bending loss value, W is an input wavelength when said input wavelength is in the range between 750 nm and 1300 nm, said winding number is 20 and said bending radius is 6.8 mm.

26. A wavelength to optical power converter used for measuring a wavelength, comprising:
    an input fiber pigtail for inputting an optical wavelength signal;
    a cylinder for fixing said spiral fiber;
    a spiral fiber connected to said input fiber pigtail and wrapped around said fixed radius of said cylinder;
    an output fiber pigtail extended from said spiral fiber; and an optical detector connected to said output fiber pigtail for reading a signal from said output fiber pigtail to generate said optical power, wherein said fixed radius of said cylinder is smaller than 10 mm when said optical wavelength signal is in the range between 750 nm and 1300 nm, and said fixed radius of said cylinder is more than 10 mm when said optical wavelength signal is in the range between 1300 nm and 1750 nm and said spiral fiber outputs said optical power in response to said optical wavelength signal, thereby performing the conversion from said wavelength into said optical power.

* * * * *